United States Patent
Zhu

(10) Patent No.: US 10,481,036 B2
(45) Date of Patent: Nov. 19, 2019

(54) PIPELINE LEAK DETECTION SYSTEM

(71) Applicant: Medeng Research Institute Ltd., Calgary (CA)

(72) Inventor: Liu Willow Zhu, Calgary (CA)

( * ) Notice: Subject to any disclaimer, the term of this patent is extended or adjusted under 35 U.S.C. 154(b) by 504 days.

(21) Appl. No.: 14/699,523

(22) Filed: Apr. 29, 2015

(65) Prior Publication Data
US 2016/0320261 A1 Nov. 3, 2016

(51) Int. Cl.
*G01M 3/28* (2006.01)
*G01M 3/24* (2006.01)

(52) U.S. Cl.
CPC .......... *G01M 3/2807* (2013.01); *G01M 3/243* (2013.01)

(58) Field of Classification Search
CPC ............................ G01M 3/2807; G01M 3/243
See application file for complete search history.

(56) References Cited

U.S. PATENT DOCUMENTS

| | | | |
|---|---|---|---|
| 3,691,819 A * | 9/1972 | Guest ..................... | G01V 15/00 346/33 P |
| 4,280,356 A * | 7/1981 | Stewart ............... | G01M 3/2807 73/40.5 R |
| 4,308,746 A | 1/1982 | Covington | |
| 4,785,666 A * | 11/1988 | Bergquist .............. | G01M 3/202 62/55.5 |
| 5,388,445 A | 2/1995 | Walters et al. | |
| 5,548,530 A * | 8/1996 | Baumoel ............... | G01M 3/243 702/48 |
| 6,442,999 B1 * | 9/2002 | Baumoel .................. | G01F 1/66 73/40.5 A |
| 6,668,619 B2 | 12/2003 | Yang et al. | |
| 6,970,808 B2 | 11/2005 | Abhulimen et al. | |
| 8,479,566 B2 | 7/2013 | Haseloh et al. | |
| 8,620,602 B2 | 12/2013 | Alonso | |
| 8,635,051 B1 * | 1/2014 | Wu ........................ | G06N 3/126 703/9 |
| 8,766,806 B2 | 7/2014 | McDowell | |
| 2008/0284174 A1 * | 11/2008 | Nagler .................... | F03B 13/00 290/54 |
| 2013/0066568 A1 * | 3/2013 | Alonso ................. | G01M 3/243 702/51 |
| 2014/0142870 A1 * | 5/2014 | Duan .................. | G01M 3/2815 702/47 |

OTHER PUBLICATIONS

Taieb ( Non patent literature tittle ( Leak Detection By Using The Impedance method).*
Wang et al, Analysis of a Transient in a Pipeline with a Leak Using Laplace Transforms.*
Canadian Patent Application No. 2,924,849, Office Action dated Dec. 5, 2017.

* cited by examiner

*Primary Examiner* — Mamadou L Diallo
(74) *Attorney, Agent, or Firm* — Jackson Walker LLP

(57) ABSTRACT

This disclosure is related to the in-service detection of a leak in a flow line, whether the medium is a fluid, liquid or gas, a mixture of fluids (gas and liquids). More particularly, the invention is related to a device or devices in series and interconnected that monitor the flow and detects immediately the occurrence of a leak, accurately pinpointing its location and calculating the quantity of the leak.

14 Claims, 3 Drawing Sheets

PIPELINE LEAK DETECTION SYSTEM

FIELD

The present disclosure relates generally to monitoring the operation of a pipeline. More particularly, the present disclosure relates to detecting a leak, locating a leak, and quantifying a leak in a pipeline.

BACKGROUND

Pipeline networks are the most economic and safest mode of transport for mineral oil, gases and other fluid products. As a means of long-distance transport, pipelines have to fulfill high demands of safety, reliability and efficiency. Most pipelines, regardless of what they transport, are designed with a typical life span of 25 years. When they do begin to fail, they do so slowly beginning with leaks at poor construction joints, corrosion points and small structural material cracks, and gradually progress to a catastrophic ending. But there are also other reasons for leak disasters such as accidents, terror, sabotage, or theft.

The primary purpose of leak detection systems (LDS) is to assist pipeline controllers in detecting and localizing leaks. LDS Systems provide an alarm and display other related data to the pipeline controllers in order to aid in decision-making. Pipeline leak detection systems are also beneficial because they can enhance productivity and system reliability thanks to reduced downtime and reduced inspection time. LDS Systems are therefore an important aspect of pipeline technology.

According to the API document "RP 1130", LDS Systems are divided into internally based LDS Systems and externally based LDS Systems. Internally based systems utilize field instrumentation (for example flow, pressure or fluid temperature sensors) to monitor internal pipeline parameters. Externally based systems also utilize field instrumentation (for example infrared radiometers or thermal cameras, vapor sensors, acoustic microphones or fiber-optic cables) to monitor external pipeline parameters.

It is, therefore, desirable to provide improved systems and methods for detecting, locating and quantifying a leak in a pipeline.

SUMMARY

It is an object of the present disclosure to obviate or mitigate at least one disadvantage of previous pipeline leak detection systems and methods.

The disclosed method and system provides an internally based system that incorporates flow metering instruments, such as a multiphase flow meter with the capacity to measure at least mass flow rate and pressure. However, the flow meter may also measure individual phase mass flow rates, mixture densities, dynamic viscosity, pressure and temperature.

In the present disclosure, a pipeline of any given length is equipped at each extremity with a MPFM or other multiphase measurement device capable of performing the real time measurements of the mass flow rate. A pressure or flow disturbance can have several causes, such as a change in load or unload conditions at the pipeline extremities or a leak at any location between the extremities. Whatever the cause, pressure and flow disturbances will travel through the pipeline in both upstream and downstream directions in the form of perturbation waves from the location where the disturbance is caused. The studies of flow perturbations, changes in pressure and flow rate, provide information that makes it possible to determine the source and the cause of the perturbation, and consequently uniquely determine if a leak has occurred, the leak flow rate and its location.

The present disclosure provides a method to investigate the propagation of transient waveforms towards both upstream and downstream extremities of the pipeline in order to couple these perturbation waves emanating from a leakage point and establish a reliable leak detection criterion. The transient analysis of pressure and flow rate waveforms may also be used to determine wave velocity and leak location.

When a breach occurs on a pipeline, the pressure and flow rate around the point of breach are subject to turbulence. This turbulence propagates in the form of waves (perturbation waves) both upstream and downstream of the breach. A transient analysis allows the monitoring of the leak perturbation wave fronts, which in turn offers a method of leak detection.

However in order to accurately detect a leak, the method of monitoring perturbation wave fronts needs to establish a single criteria that is not contaminated by other causes of wave fronts travelling through the pipeline. Perturbation waves may have multiple causes. Typically the other causes of perturbation waves are located at the extremities of a pipeline, where hydrodynamic circumstances result from a pump/compressor station at the upstream end or a tank terminal at the downstream end. These will generate perturbation waves travelling across the pipeline as well and will combine with and deform a leak perturbation wave front. Furthermore the wave amplitude for any perturbation wave will dissipate gradually over distances. Therefore, the monitoring pressure and flow rate perturbations wave front does not alone constitute alone a conclusive method in detecting a leak, as it may lead to false alarms or the non-detection of a minor leak.

The disclosed method and system uniquely avoids relying directly and solely on the monitoring and analysis of pressure and flow rate perturbation waves. The method eliminates the contamination of leak detection by other causes of perturbation wave fronts and it amplifies the signals that are uniquely caused by a leak, improving both the reliability and the sensitivity of detection. This is achieved through a transient analysis of new functions, here named Leak Response Functions (LRF).

In a first aspect, the present disclosure provides a method for detecting, locating, and measuring a leak in a closed system flow line including at frequent intervals or continuously, receiving mass flow rate and pressure measurements from an upstream meter, at frequent intervals or continuously, receiving mass flow rate and pressure measurements from a downstream meter, and performing, in a transient analysis, at least one leak response function using the measurements received from the upstream meter and the downstream meter.

In an embodiment disclosed, the method includes performing an upstream leak response function using the measurements received from the upstream meter, according to:

$$LRF_a = Z_0 \frac{(1 - \delta_{Pa})}{(1 + \delta_{Qa})}$$

where $\delta_{Pa}$ is an upstream leak pressure alteration factor, $\delta_{Qa}$ is an upstream leak flow alteration factor, and $Z_Q$ a characteristic impedance of the pipeline, according to:

$$Z_0 = \frac{P_a^{n=0}}{Q_a^{n=0}}$$

where $P_a^{n=0}$ is the upstream pressure before the leak, and $Q_a^{n=0}$ is the upstream mass flow before leak, performing a downstream leak response function using the measurements received from the downstream meter, according to:

$$LRF_b = P_0(1-\delta_{Pb})(1-\delta_{Qb})$$

where $\delta_{Pb}$ is a downstream leak pressure alteration factor, $\delta_{Qb}$ is a downstream leak flow alteration factor, and $P_0$ is a power output of the pipeline, according to:

$$P_0 = P_b^{m=0} Q_b^{m=0}$$

where $P_b^{n=0}$ is a downstream pressure before the leak, and $Q_b^{n=0}$ is a downstream mass flow before the leak, and indicating a leak event when $LRF_a$ and $LRF_b$ are concurrently trending downward.

In an embodiment disclosed, $LRF_a$ and $LRF_b$ are concurrently trending downward by at least a predetermined leak response function threshold.

In an embodiment disclosed, the leak response function threshold is the combined measurement accuracy of the mass flow rate and pressure measurements from the upstream meter and the mass flow rate and pressure measurements from the downstream meter.

In an embodiment disclosed, wherein the distance between the upstream meter and the downstream meter is L, the method further including detecting a first perturbation wave at the upstream meter at a time $(t_a^{n=1})$, detecting a first perturbation wave at the downstream meter at a time $(t_b^{m=1})$, detecting a first reflected perturbation wave at the upstream meter at a time $(t_a^{n=2})$, and performing the following leak response function, according to:

$$X = \frac{L}{2}\left(1 + \frac{t_a^{n=1} - t_b^{m=1}}{t_b^{m=1} - t_a^{n=2}}\right)$$

wherein X is the distance from the upstream meter to the leak.

In an embodiment disclosed, the distance between the upstream meter and the downstream meter is L, the method further including detecting a first perturbation wave at the upstream meter at a time $(t_a^{n=1})$ $t_a^{n=1}$, detecting a first perturbation wave at the downstream meter at a time $(t_b^{m=1})$, detecting a first reflected perturbation wave at the downstream meter at a time $(t_b^{m=2})$, and performing the following leak response function, according to:

$$Y = L - \frac{L}{2}\left(1 + \frac{t_a^{n=1} - t_b^{m=1}}{t_b^{m=1} - t_a^{n=2}}\right)$$

where Y is the distance from the downstream meter to the leak.

In an embodiment disclosed, the method further includes detecting a first perturbation wave at the upstream meter $(P_a^{n=1})$, detecting a first perturbation wave at the downstream meter $(P_b^{m=1})$, performing the following leak response function, according to:

$$Q_{leak}(t) = Q_a(t) - Q_b(t) - \frac{dQ}{dt}$$

where
$Q_a^{n=1}$=flow rate at the upstream meter, influenced by the leak perturbation wave,
$Q_b^{m=1}$=flow rate at downstream meter 3 at location b influenced by the leak perturbation wave,
wherein $Q_{leak}^{i=1}$=leak mass flow rate.

In an embodiment disclosed, the upstream meter is downstream from a pump or compressor.

In an embodiment disclosed, the downstream meter is upstream from a pump or compressor.

In a further aspect, the present disclosure provides a method for detecting, locating, and measuring a leak in a closed system flow line including at frequent intervals or continuously, receiving an upstream leak response function $LFR_a$, from an upstream meter, at frequent intervals or continuously, receiving a downstream leak response function $LRF_b$, from a downstream meter, assessing, in a transient analysis, the $LRF_a$ and the $LRF_b$, the upstream leak response function $LRF_a$ calculated according to:

$$LRF_a = Z_0 \frac{(1-\delta_{Pa})}{(1+\delta_{Qa})}$$

where $\delta_{Pa}$ is an upstream leak pressure alteration factor, $\delta_{Qa}$ is an upstream leak flow alteration factor, and $Z_0$ is a characteristic impedance of the pipeline, according to:

$$Z_0 = \frac{P_a^{n=0}}{Q_a^{n=0}}$$

where $P_a^{n=0}$ is an upstream pressure before the leak, and $Q_a^{n=0}$=upstream mass flow before the leak, the downstream leak response function $LRF_b$ calculated according to:

$$LRF_b = P_0(1-\delta_{Pb})(1-\delta_{Qb})$$

where $\delta_{Pb}$ is a downstream leak pressure alteration factor, $\delta_{Qb}$ is a downstream leak flow alteration factor, and $P_0$ is a power output of the pipeline, according to:

$$P_0 = P_b^{m=0} Q_b^{m=0}$$

where $P_b^{m=0}$ is a downstream pressure before the leak, and $Q_b^{m=0}$ is a downstream mass flow before the leak, and indicating a leak event when $LRF_a$ and $LRF_b$ are concurrently trending downward.

In a further aspect, the present disclosure provides a system for detecting, locating, and measuring a leak in a closed system flow line with a control centre, including an upstream meter for measuring pressure and mass flow rate, a downstream meter for measuring pressure and mass flow rate, a remote terminal unit for continuously receiving pressure and mass flow rate data from the upstream meter and sending it to the control center, a remote terminal unit for continuously receiving pressure and mass flow rate data from the downstream meter and sending it to the control center, and a control center, continuously receiving the data from the remote terminal unit, the control center having a SCADA system for determining a leak response function.

In an embodiment disclosed, the pipeline is composed of multiple sections with intermediary pumping stations or compressor stations.

In an embodiment disclosed, the pipeline carries any fluid such as water, oil or gas or multiphase mixture including components of water, oil or gas.

In a further aspect, the present disclosure provides a supervisory control and data acquisition (SCADA) system for a pipeline control center for detecting, locating, and measuring a leak in a closed system flow line, including a receiver for continuously receiving mass flow rate data and pressure data from an upstream meter and mass flow rate data and pressure data from a downstream meter, a computer for performing, in a transient analysis, an upstream leak response function $LRF_a$ using the data received from the upstream meter and a downstream leak response function $LRF_b$ using the date received from the downstream meter.

In a further aspect, the present disclosure provides computer readable medium having stored thereon computer instructions or programs to perform the method of the present disclosure.

In a further aspect, the present disclosure provides a flow meter system for a pipeline, including a mass flow element for measuring mass flow Q through the pipeline, a pressure element for measuring pressure P of the pipeline, a computer adapted to calculate, in a transient analysis, an upstream leak response function and a downstream leak response function, wherein:

the upstream leak response function is:

$$LRF_a = Z_0 \frac{(1 - \delta_{Pa})}{(1 + \delta_{Qa})}$$

where $\delta_{Pa}$ is an upstream leak pressure alteration factor, $\delta_{Qa}$ is an upstream leak flow alteration factor, and $Z_0$ is a characteristic impedance of the pipeline, according to:

$$Z_0 = \frac{P^0}{Q^0}$$

where $P^0$ is an upstream pressure before the leak, and $Q^0$ is an upstream mass flow before the leak; and the downstream leak response function is:

$$LRF_b = P_0(1-\delta_{Pb})(1-\delta_{Qb})$$

where $\delta_{Pb}$ is a downstream leak pressure alteration factor, $\delta_{Qb}$ is a downstream leak flow alteration factor, and $P_0$ is a power output of the pipeline, according to:

$$P_0 = P_b^{m=0} Q_b^{m=0}$$

where $P_b^{m=0}$ is a downstream pressure before the leak, and $Q_b^{m=0}$ is a downstream mass flow before the leak, and a transmitter for transmitting the upstream leak response function $LRF_a$ or the downstream leak response function $LRF_b$, or both, to a pipeline control center.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a method, system, and computer readable medium for detecting, locating, and measuring a leak in a closed system flow line.

Pipeline Arrangement

Figure 1:
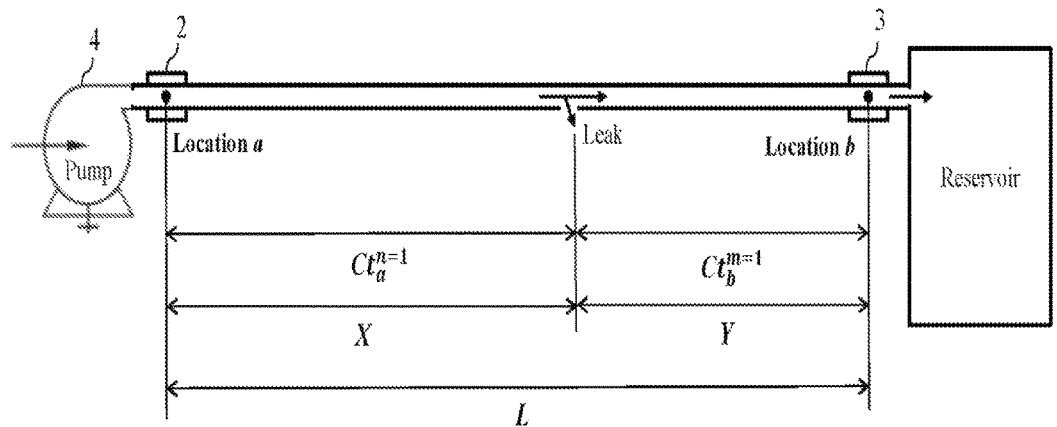
FIG. 1 is a simplified schematic illustration of a pipeline leak detection system of the present disclosure in a typical pipeline arrangement.

FIG. 1 illustrates a typical pipeline arrangement of any given length. At each end of a pipeline, the pipeline is equipped with a meter, preferably a multiphase measurement device capable of performing real time measurements. In this arrangement, upstream meter 2 at location a continuously measures pressure Pa, flow rate Qa, and temperature Ta at an upstream location of the pipeline after the pump/compressor station and downstream meter 3 at location b continuously measures pressure Pb, flow rate Qb and temperature Tb at a downstream location of the pipeline before another pump/compressor station or a tank terminal.

The meter measurements are used to determine a leak response function in order to detect a leak event. In an embodiment disclosed, the leak location, the leak rate, or both may be determined.

Figure 2:
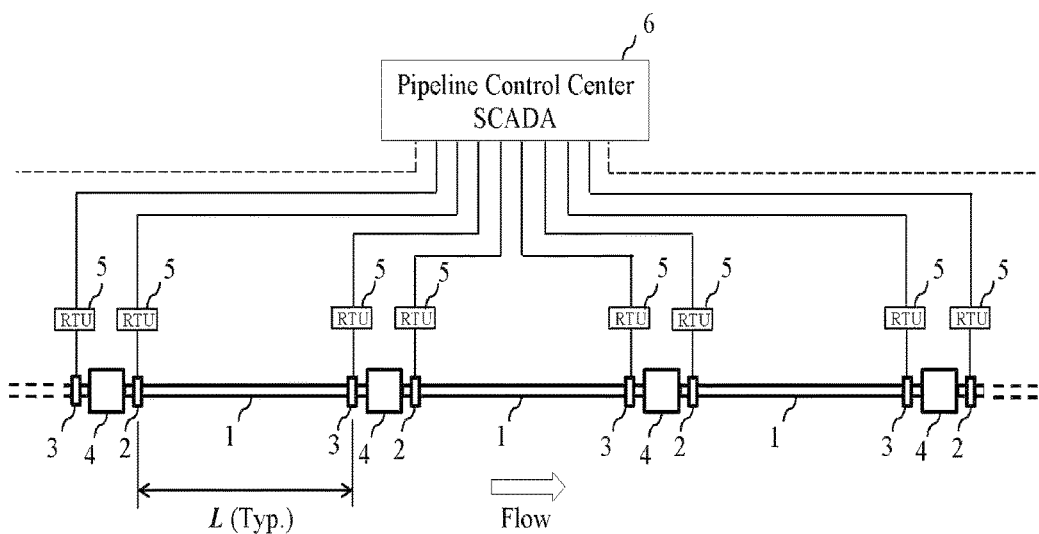
FIG. 2 is a simplified schematic of a pipeline leak detection system of the present disclosure in a supervisory control and data acquisition (SCADA) system.

As shown in FIG. 2, a typical pipeline is formed by a series of pipeline segments 1 (or conduit) of any given length, size or diameter, with compressor stations or pumping stations 4 between pipeline segments. FIG. 2 is a schematic diagram of the full and large scale embodiment of the invention where a pipeline is continuous and of an undetermined length. In the leak detection system of the present disclosure an upstream meter 2 and downstream meter 3 are used to detect a leak event, were one to occur, in pipeline segment 1.

Upstream meter 2, at location a is an inlet to the segment 1. The upstream meter 2 is of any type or make providing real-time measurements, including, but not limited to mass flow rate Q and pressure P. Similarly, downstream meter 3 at location b is an outlet to the segment 1, and may be of any type or make providing real-time measurements, including but not limited to mass flow rate Q and pressure P.

A remote terminal unit (RTU) 5 transmits the pressure, temperature, and mass flow rate measurements/data/signal from the upstream meter 2 to interface with the pipeline control center 6 and its supervisory control and data acquisition (SCADA) system. Similarly, a remote terminal unit (RTU) 5 continuously conveys the pressure, temperature, and mass flow rate measurements/data/signal from the downstream meter 3 to interface with the pipeline control center 6 and its SCADA system.

The pipeline control center 6 uses the data from the upstream meter 2 and downstream meter 3 to continually calculate various leak response functions. As described herein, the leak response functions may assist to detect a leak, locate a leak, or quantify a leak, or combinations thereof.

The disclosed method may be executed through software housed within the computing systems of the pipeline control center 6, and use as inputs the meter measurement data and information gathered at a high frequency by the SCADA. The hardware unit specifically handling the computing relative to the present invention can be of many different types and locations which does not affect the nature of the invention.

Leak Event

A leak that occurs in the pipeline at any location will cause a perturbation to travel in the form of a wave going both in the upstream and downstream directions, in time reaching both upstream meter 2 at location a and downstream meter 3 at location b. Leak Response Functions ($LRF_a$ and $LRF_b$ described below) are computed from the mass flow and pressure at location a and location b respectively. The Leak Response Functions may be computed at each meter, or the data may be sent to the pipeline control center 6 and the Leak Response Functions computed in the SCADA system or other associated computer system. When the perturbation wave reaches the upstream meter 2 at location a and the downstream meter 3 at b, both Leak Response Functions ($LRF_a$ and $LRF_b$) instantaneously adopt a characteristic trend which uniquely determines that a leak has occurred, forming a pattern that constitutes a leak detection criterion.

Figure 3:
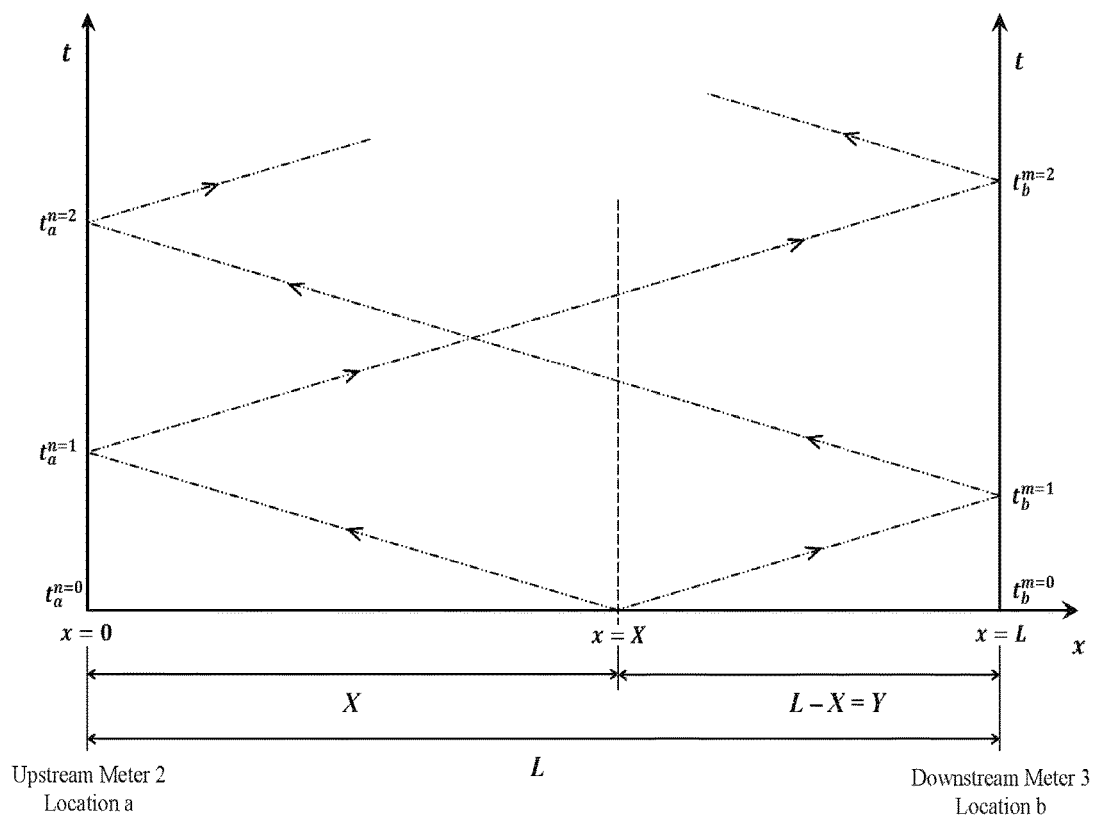
FIG. 3 illustrates the transient progression over time of the perturbation waves travelling over the length of a pipeline.

Referring to FIG. 3, with a pipeline segment extending between location a (upstream meter 2) and location b (downstream meter 3), a distance L apart, the pre-leak pressure at location a is $P_a^{n=0}$ and the pre-leak pressure at location b is $P_b^{m=0}$. Upon a leak event at location x=X, a perturbation wave will propagate from X along the pipeline in opposite directions towards both location a and location b, reaching location a and location b at a time $t_a^{n=1}$ and $t_b^{m=1}$ respectively. A second perturbation wave is detected at location a at time $t_a^{n=2}$ and at location b at time $t_b^{m=2}$ respectively.

Leak Detection

Functions $LRF_a$ and $LRF_b$ are transient functions expressed as:

$$LRF_a(P_a(t), Q_a(t), t)$$

and $$LRF_b(P_b(t), Q_b(t), t)$$

where $LRF_a$ is the transient leak response function at meter 2 at location a, $LRF_b$ is the transient leak response function at meter 3 at location b, $P_a(t)$ is the pressure at meter 2 at location a, $Q_a(t)$ is the flow rate at meter 2 location a, $P_b(t)$ is the pressure at meter 3 at location b, $Q_b(t)$ is the flow rate at meter 3 at location b, and t is time.

To detect a leak, a leak response function $LRF_a$ is calculated using data received from the upstream meter 2 at location a, and a leak response function $LRF_b$ is calculated using data received from the downstream meter 3 at location b.

The leak response function $LRF_a$ is expressed as:

$$LFR_a(t) = \frac{P_a(t)}{Q_a(t)} \quad (1)$$

where $P_a(t)$ is the transient expression of pressure at upstream meter 2 at location a, as influenced by a leak over time t, and $Q_a(t)$ is the transient expression of flow at upstream meter 2 at location a, as influenced by a leak over time t.

The leak response function $LRF_b$ is expressed as:

$$LRF_b = P_b(t) Q_b(t) \quad (2)$$

where $P_b(t)$ is the transient expression of pressure at downstream meter 3 at location b, as influenced by a leak over time t, and $Q_b(t)$=transient expression of flow at downstream meter 3 at location b, as influenced by a leak over time t.

Pressure $P_a$ and flow $Q_a$ are measured on a real-time and continuous basis by the upstream meter 2 at location a in order to trace variations when they occur. Similarly pressure $P_b$ and flow $Q_b$ are measured on a real-time and continuous basis by the downstream meter 3 at location b. As discussed previously, measured variations of pressure and flow may potentially have several causes. Hydrodynamic events of several sorts may occur in the pipeline, and a leak being only one such potential cause of pressure and flow variations. Also it should be noted that flow in a pipeline is induced mechanically by pump/compressor stations, and as this work is performed upstream of the upstream meter 2 at location a and downstream of the downstream meter 3 at location b, it causes waves of compression and decompression to travel through the pipeline and cause variations in measured pressure and flow. At b, the operation of a tank terminal may cause upstream pressure and flow variations as well. On the basis of observing the variations of $P_a$, $Q_a$, $P_b$ and $Q_b$ alone, the cause of these variations cannot be immediately identified or isolated with certitude. Therefore, the disclosed method and system does not make direct use of the real-time measurement of pressure or flow at the upstream meter 2 at location a or the downstream meter 3 at location b, but instead uses these measurements in the two separate Leak Response Functions $LRF_a$ and $LRF_b$ which will identify a pattern uniquely attributable to a leak and to no other possible cause, filtering them out.

Referring to the simplified schematic of FIG. 1, $LRF_a$ is independent of the working conditions of an upstream pump/compressor station (before-load) while $LRF_b$ is independent from the working conditions of the downstream tank terminal (afterload). The independence of the LRF from preload and afterload eliminates the possibility of a contamination of the response by other and random flow perturbations.

Perturbation Influence on Pressure

Figure 4:
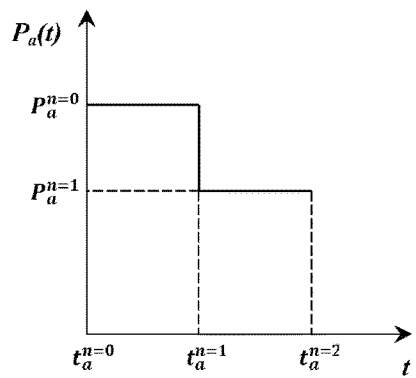
FIG. 4 illustrates the transient variations of pressure P at both extremities of the pipeline, upon a leak event.
Figure 4:
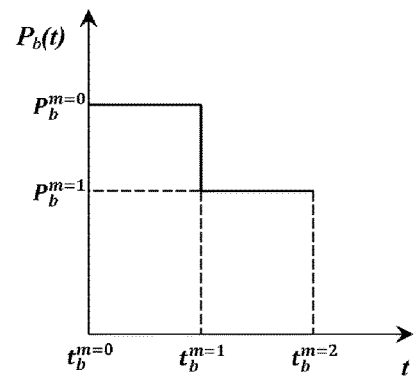

As shown in FIG. 4, a leak at any location between the upstream meter 2 at location a and downstream meter 3 at location b will cause the pressure to decline at both meters. The specific change in pressure will depend on the severity of the leak.

Referring to FIG. 4, at the upstream meter 2 at location a, the pressure starts out at $P_a^{n=0}$ (pre-perturbation) at time $t_a^{n=0}$, but then drops to pressure $P_a^{n=1}$ at time $t_a^{n=1}$ and stays there until at least time $t_a^{n=2}$.

At the downstream meter 3, at location b, the pressure starts out at $P_b^{m=0}$ (pre-perturbation) at time $t_b^{m=0}$, but then drops to pressure $P_b^{m=1}$ at time $t_b^{m=1}$ and stays there until at least $t_b^{m=2}$.

Perturbation Influence on Flow Rate

Figure 5:
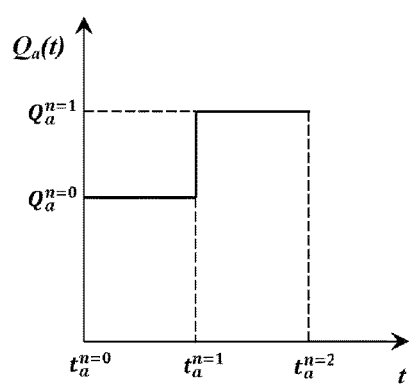
FIG. 5 illustrates the transient variations of flow rate Q at both extremities of the pipeline, upon a leak event.
Figure 5:
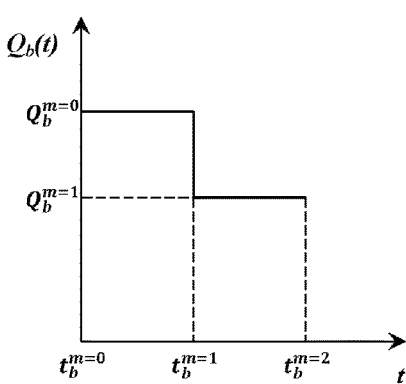

As shown in FIG. 5, a leak event will influence flow rates differently at the upstream meter 2 at location a and the downstream meter 3 at location b. At upstream meter 2 at location a, the flow rate will increase, while at downstream meter 3 at location b, the flow rate will decrease. The specific change in flow rate will depend on the severity of the leak.

As shown in FIG. 3, when a leak occurs in the pipeline, a perturbation wave will propagate from the leak location towards the upstream and downstream meter.

The effect of the first perturbation wave to arrive at upstream meter 2 at location a takes place during the time interval $t_a^{n=1} \leq t \leq t_a^{n=2}$, similarly the effect of the first perturbation wave to arrive at downstream meter 3 at location b takes place during the time interval $t_b^{m=1} \leq t \leq t_b^{m=2}$.

The graphs are show a stepped variation of the values of P and Q because the time intervals between the arrivals of successive leak perturbation waves is very small. In a pipeline, over such small intervals of time, pressures and flow rates would not vary. For example: Assume a 6" pipeline segment that carries oil over a 40 km stretch and a leak occurs at 20 km from each end, the leak perturbation wave will take less than 7 seconds to reach either ends. That would be a long interval by comparison to most situations. Over such a small time frame, flow rates and pressures are by nature virtually constant in a pipeline and hence the flat line on the graphs.

At Upstream meter 2 at location a, during the time interval $t_a^{n=1} \leq t \leq t_a^{n=2}$, the transient equations of pressure and flow rate are expressed as:

$$P_a^{n=1} = P_a^{n=0} - \delta_{Pa} P_a^{n=0} = P_a^{n=0}(1 - \delta_{Pa}) \quad (3)$$

and $$Q_a^{n=1} = Q_a^{n=0} + \delta_{Qa} Q_a^{n=0} = Q_a^{n=0}(1 - \delta_{Qa}) \quad (4)$$

where $P_a^{n=0}$=Pressure at upstream meter 2 at location a prior to leak, $P_a^{n=1}$=Pressure at upstream meter 2 at location a after leak perturbation wave arrives, $Q_a^{n=0}$=Flow at upstream meter 2 at location a prior to leak, $P_a^{n=1}$=Flow at upstream meter 2 at location a after leak perturbation wave arrives, $\delta_{Pa}$=Leak pressure alteration factor at upstream meter 2 at location a; and $\delta_{Qa}$=Leak flow alteration factor at meter 2 at location a.

The leak pressure alteration factor and the leak flow alteration factor are computed from the P and Q measurements respectively. The factors are the ratio of two subsequent measurements at say $t^{n=0}$ and $t^{n=1}$ and represent the step in P and Q when a leak perturbation wave hits the meter. As the factors are real time computations, they are not the same at both extremities and so for clarity appropriate subscripts "a" and "b" below represent upstream location a and downstream location b respectively.

The leak pressure and flow alteration factors $\delta_P$ and $\delta_Q$ must be a value bound by the following relationship:

$$\delta_{Pa} \leq 1, \delta_{Qa} \leq 1$$

By substituting into equation (1) the above equations (3) and (4), the leak response function $LRF_a$ can be expressed as:

$$LFR_a = \frac{P_a^{n=1}}{Q_a^{n=1}} = \frac{P_a^{n=0}(1 - \delta_{Pa})}{Q_a^{n=0}(1 + \delta_{Qa})} \quad (5)$$

The leak response function $LRF_a$ is a two component transient equation since the factor $$\frac{P_a^{n=0}}{Q_a^{n=0}}$$

is also called $Z_0$, the characteristic impedance of the transmission line.

Therefore the Leak Response Function $LRF_a$ can also be expressed as:

$$LRF_a = Z_0 \frac{(1 - \delta_{Pa})}{(1 + \delta_{Qa})} \quad (6)$$

where $Z_0$ is the characteristic impedance of the pipeline.

The propagation characteristics of the perturbation wave are determined by the characteristic impedance of the pipeline, and that the latter is not influenced by upstream conditions. Upon the occurrence of a leak, the second component of the leak response function $LRF_a$ will transient downwardly in a pattern expressed as:

$$\frac{(1 - \delta_{Pa})}{(1 + \delta_{Qa})} \leq 1 \text{ and } \downarrow$$

The Leak Response Function as defined above, by forming a ratio of pressure over flow, amplifies the effects that a leak perturbation wave would has on the pressure and the flow individually, thus providing an improvement on the sensitivity and reliability of a detection, this while providing improved isolation from the perturbation waves caused by other hydrodynamic events.

Similarly, at downstream meter 3 at location b, during the time interval $t_b^{m=1} \leq t \leq t_b^{m=2}$, the transient equations of pressure and flow rate are expressed as:

$$P_b^{m=1} = P_b^{m=0} - \delta_{Pa} P_b^{m=0} = P_b^{m=0}(1 - \delta_{Pa}) \quad (7)$$

and $$Q_b^{m=1} = Q_b^{m=0} + \delta_{Qa} Q_b^{m=0} = Q_b^{m=0}(1 - \delta_{Qa}) \quad (8)$$

where $P_b^{m=0}$=pressure at downstream meter 3 at location b, prior to leak, $P_b^{m=1}$=pressure at downstream meter 3 at location b, after leak perturbation wave arrives, $Q_b^{m=0}$=flow at downstream meter 3 at location b, prior to leak, $P_b^{m=1}$=flow at downstream meter 3 at location b, after leak perturbation wave arrives, $\delta_P$=leak pressure alteration factor for downstream meter 3 at location b; and $\delta_Q$=leak flow alteration factor for downstream meter 3 at location b.

The leak pressure and flow alteration factors $\delta_P$ and $\delta_Q$ must be a value bound by the following relationship:

$$\delta_{Pb} \leq 1, \delta_{Qb} \leq 1$$

By substituting into equation (2) the above equations (7) and (8), the leak response function $LRF_b$ can be expressed as:

$$LRF_b = P_b^{m=1} Q_b^{m=1} = P_b^{m=0}(1 - \delta_{Pb}) Q_b^{m=0}(1 - \delta_{Qb})$$
$$= P_b^{m=0} Q_b^{m=0}(1 - \delta_{Pb})(1 - \delta_{Qb}) \quad (9)$$

The leak response function $LRF_b$ is thus a two component transient equation since the factor $P_b^{m=0} Q_b^{m=0}$ is also called $P_0$, the power output of the transmission line.

Therefore, the leak response function $LRF_b$ can also be expressed as:

$$LRF_b = P_0(1 - \delta_{Pb})(1 - \delta_{Qb}) \quad (10)$$

where $P_0$=power output of the pipeline.

Upon the occurrence of leak, the second component of the leak response function $LRF_b$ will transient downwardly in a pattern expressed as:

$$(1-\delta_{Pb})(1-\delta_{Qb}) \le 1 \text{ and } 1$$

In combination and computed simultaneously, the trending downwardly of $LRF_a$ and $LRF_b$ offer a sensitive criterion for the detection of a leak.

When leak response functions $LRF_a$ and $LRF_b$ trend downwardly simultaneously, there is a leak, and thus an alarm or other indicator may be issued by the computer which signals a leak in the pipeline has occurred or is occurring.

Trending downwardly of the leak response functions $LRF_a$ and $LRF_b$ occurs when computed values of each transient functions are progressively diminishing over successive iterations. Before this trending is to result in a leak alarm, a sufficient amount of time should occur to eliminate the possibility that the downwardly trends are not due to measurement errors.

Since the leak response functions are using measured values of pressure P and mass flow rate Q, within the error margins of these measurements it is possible that the downward trending of the leak response functions will indeed occur without being caused by a leak. As downwardly trending of the leak response functions occurs, a minimum threshold in triggering a leak alarm can therefore be calculated. This calculation is intended to define both an absolute value decline of the leak response functions and duration of downwardly trending to ensure that these are beyond the structural error margins of the flow meters. Such threshold calculation depends on the measurement accuracy of pressure P and mass flow rate Q.

Determination of the Leak Flow Rate:

The principle of Mass Conservation is applied in determining leaked quantities, or in other words the leak flow rate Qleak(t), expressed as:

$$Q_{leak}(t) = Q_a(t) - Q_b(t) - \frac{dQ}{dt}$$

where $Q_{leak}(t)$=leakage flow rate;
$Q_a(t)$=mass flow rate at upstream meter 2 at location a;
$Q_b(t)$=net mass flow rate at downstream meter 3 at location b; and
dQ/dt=rate of accumulation inside the pipeline between upstream meter 2 at location a and downstream meter 3 at location b.

To determine the leak flow rate, the computer is continually calculating leak response function $Q_{leak}^{i=1}$ using data received from the upstream and downstream meter.

Upon the occurrence of leak, the flow rate detected at upstream meter 2 at location a is influenced by the 1) flow $Q_a^{n=0}$ which took place prior to the leak and 2) flow $Q_a^{n=1}$, caused by leak perturbation wave arriving at upstream meter 2 at location a. The flow $Q_a^{n=1}$ will last until the first reflected perturbation wave reaches upstream meter 2 at location a.

The time period between when the first perturbation wave, $t_a^{n=0}$, and the first reflected leak perturbation wave, $t_a^{n=0}$, reaches upstream meter 2 at location a represents the first shift in the flow at upstream meter 2 at location a. After $t_a^{n=2}$, further shifts in the flow at upstream meter 2 at location a incorporate the reflected leak perturbation wave and the pipeline's end conditions.

Similarly at downstream meter 3 at location b, the leak perturbation wave will cause a shift in the flow. At downstream meter 3 at location b, the first shift in the flow will occur between when the first perturbation wave, $t_b^{m=1}$, and the first reflected perturbation wave, $t_b^{m=2}$, reaches downstream meter 3 at location b. After $t_b^{m=2}$, the flow at downstream meter 3 at location b will incorporate the reflected perturbation wave. Thus, the flow rate at downstream meter 3 at location b will reflect the leak's influence on the flow until the reflected leak perturbation wave reaches downstream meter 3 at location b.

Therefore, the leak flow rate can be expressed as:

$$Q_{leak}^{i=1} = Q_a^{n=1} - Q_b^{m=1} \qquad (11)$$

where $Q_{leak}^{i=1}$=Leak flow rate; $Q_a^{n=1}$=flow rate at upstream meter 2 at location a influenced by the leak perturbation wave; and $Q_b^{m=1}$=flow rate at downstream meter 2 at location b influenced by the leak perturbation wave.

Determination of the Leak Location:

Using data continually received from the upstream and downstream meter, the computer is capable of determining the location of the leak.

Referring to FIG. 1 where a pipeline of length L is subject to a leak at a distance X from the upstream extremity, a perturbation wave will propagate from the leak location towards the upstream and downstream extremities. This propagation wave travels along the pipeline at a velocity C. Referring to FIG. 3, a diagram illustrates the propagation of the perturbation waves from the leak location towards the extremities. Upon reaching an extremity, due to the end conditions a perturbation wave will be reflected and travel back in the opposite direction.

Upon the occurrence of leak, the time it takes the perturbation wave to reach the upstream meter 2 at location a and downstream meter 3 at location b is described as:

$$t_a^{n=1} = \frac{X}{C}, \quad t_b^{m=1} = \frac{L-X}{C} \qquad (12)$$

Similarly, the time it takes the first reflected perturbation waves to reach the upstream and downstream meter is described as:

$$t_a^{n=2} = \frac{2L-X}{C}, \qquad (13)$$

$$t_b^{m=2} = \frac{L+X}{C}$$

where $t_a^{n=1}$=time of first arrival at upstream meter 2 at location a of leak perturbation wave; $t_b^{m=1}$=time of first arrival at downstream meter 3 at location b of leak perturbation wave; $t_a^{n=2}$=time of arrival at upstream meter 3 at location a of the first reflected leak perturbation wave; $t_b^{m=2}$=time of arrival at downstream meter 3 at location b of the first reflected leak perturbation wave; $t_a^{n=x}$=time of arrival at upstream meter 2 at location a of the $(x-1)^{th}$ reflection of the leak perturbation wave; $t_b^{m=y}$=time of arrival at downstream meter 3 at location b of the $(y-1)^{th}$ reflection of the leak perturbation wave; X=distance between upstream meter 2 at location a and the leak; L=distance between upstream meter 2 at location a and downstream meter 3 at location b (total length of the pipeline); and C=leak perturbation propagation velocity.

Using the relationships in equation 12 concerning the perturbation wave, we have:

$$t_a^{n=1} - t_b^{m=1} = \frac{X}{C} - \frac{L-X}{C} = \frac{X-L+X}{C} = \frac{2X-L}{C}$$

and the leak location can be expressed as:

$$X = \frac{L}{2} + \frac{C}{2}(t_a^{n=1} - t_b^{m=1}) \qquad (14)$$

where X is the distance between meter 2 at location a and the leak, L is the distance between meter 2 at location a and meter 3 at location b (total length of the pipeline/segment), C is the leak perturbation propagation velocity, $t_a^{n=1}$ is the time of arrival at meter 2 at location a of leak perturbation wave, and $t_b^{m=1}$ is the time of arrival at meter 3 at location b of leak perturbation wave.

Similarly using both the perturbation wave and its reflection:

$$t_a^{n=1} - t_a^{n=2} = \frac{X}{C} - \frac{2L-X}{C} = \frac{X-2L+X}{C} = \frac{2X-2L}{C}$$

and the relationships in equation 13, the leak location can also be expressed as:

$$X = L + \frac{C}{2}(t_a^{n=1} - t_a^{n=2}) \qquad (15)$$

Combining equations 14 and 15, as both are expressions for the location of the leak, the transient leak wave velocity C can be expressed as:

$$C = \frac{L}{(t_a^{n=2} - t_a^{m=1})} \qquad (16)$$

By substituting equation 16 into equation 14, the leak location can be expressed without making use of the perturbation wave velocity and can be determined using only the length of the pipeline and the transient time analysis, resulting in the values $t_a^{n=1}$, $t_a^{n=2}$, $t_b^{m=1}$ and $t_b^{m=2}$. Therefore, the leak location can be expressed as $$X = \frac{L}{2} + \frac{(t_a^{n=1} - t_b^{m=1})}{2} \frac{L}{(t_a^{n=2} - t_b^{m=1})} \qquad (17)$$

and $$X = \frac{L}{2}\left(1 + \frac{t_a^{n=1} - t_b^{m=1}}{t_b^{m=1} - t_a^{n=2}}\right) \qquad (18)$$

As the above equation 18 illustrates, the leak location X can be expressed without making use of the wave velocity C and can be derived using only the length of the pipeline L and the results of the transient time analysis resulting in the values $t_a^{n=1}$, $t_a^{n=2}$, $t_b^{m=1}$ and $t_b^{m=2}$.

The location of the leak may be similarly determined relative to the downstream meter 3 at location b.

If one defines:

Y=distance between the leak and the downstream meter 3 at location b;

and:

Y+X=L and:

Y=L-X

Then the leak location from the downstream meter 3 at location b is expressed as:

$$Y = L - \frac{L}{2}\left(1 + \frac{t_a^{n=1} - t_b^{m=1}}{t_b^{m=1} - t_a^{n=2}}\right)$$

Oil pipelines are made from steel or plastic tubes with inner diameter typically from 4 to 48 inches (100 to 1,220 mm). Most pipelines are typically buried at a depth of about 3 to 6 feet (0.91 to 1.83 m).

The total length of the pipeline has little to do with the length that oil can be pumped in a pipe. This is because a pipeline is broken into many smaller segments between pumping stations. Stations are conveniently located either where required (see discussion below) or where another pipeline joins in.

Pipelines are rarely one single pipe between point A and point B. They have lots of smaller pipelines connecting into them. Each of these pipeline will have their own pump stations. These stations also help to divide the pipeline into segments. With segments, you can ensure that different oil is sent to specific locations.

Distances between pumping stations vary greatly depending on the fluid being transported and other conditions and logistics. Such distances can vary from a few kilometers to over one hundred kilometers.

This disclosure is related to the in-service detection of a leak in a flow line, whether the medium is a fluid, liquid or gas, a mixture of fluids (gas and liquids). More particularly, the invention is related to a device or devices in series and interconnected that monitor the flow and detects immediately the occurrence of a leak, accurately pinpointing its location and calculating the quantity or rate of the leak.

In an embodiment disclosed, the present disclosure provides a system and method which derives directly a perturbation wave velocity, analyzes the transient wave forms of pressure and flow perturbations as they travel through the pipeline, has the ability to capture the transient changes in the leak flow, and be introducing $LRF_a$ and $LRF_b$, the present invention provides a criterion that conclusively and uniquely detects a leak and this criterion in much less affected by other changes in flow conditions.

In an embodiment disclosed, the meter is a mass flow meter. In an embodiment disclosed, the leak location and the leak flow rate are computed from real time measurements alone, not involving a statistical benchmark with a pre-calculated standard deviation in managing the alarms. The present method and system does not require historical information, as the method and system itself is one that self-generates all the information it needs to function.

In an embodiment disclosed a segment 1 may use a plurality of meters. For example a segment 1 may have three meters. A first meter proximate a first end of the segment 1, a second meter proximate a second end of the segment 1, opposite the first end, and an third meter between the first meter and the second meter. In this configuration, with the first end upstream and the second end downstream, the third meter serves a dual-role. The third meter is the upstream meter in the segment between the third meter and the second meter, and the third meter is the downstream meter in the segment between the first meter and the third meter. Thus both $LRF_a$ and $LRF_b$ would be determined for the third meter, but $LRF_a$ would be used with $LRF_b$ from the second meter and $LRF_b$ would be used with the $LFR_a$ from the first meter. Thus, the third meter, or any intermediate meter, may be, for a given segment, an upstream meter, or a downstream meter, or both.

In an embodiment disclosed, the measurements are transmitted back to a central system, where the Leak Response Function are calculated. However, the Leak Response Function may be calculated at the meter, or intermediate the meter and the central system, and the Leak Response Function (rather than the measurement) received at the central system.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for detecting, locating, and measuring a leak in a closed system fluid transport pipeline using in-line multiphase mass flow meters at an upstream location and a downstream location, the method comprising:

continuously measuring the real-time multiphase mixture mass flow rate and mixture pressure with an upstream meter in the fluid transport pipeline at the upstream location a;

continuously measuring the real-time multiphase mixture mass flow rate and mixture pressure with a downstream meter in the fluid transport pipeline at the downstream location b; and performing, in an automated, real-time transient analysis, of a leak response function using the above real-time measurements comprising:

detecting an upstream first n=1 leak perturbation wave at the upstream location a at time $t_a^{n=1}$, having a transient pressure of $P_a^{n=1}$ a and a transient mass flow rate of $Q_a^{n=1}$;

detecting a downstream first m=1 leak perturbation wave at the downstream location b at a time $t_b^{m=1}$, having a transient pressure of $P_b^{m=1}$ and a transient mass flow rate of $Q_b^{m=1}$;

determining, independent of boundary conditions, an upstream leak response function $LRF_a$ using the mass flow rate and pressure measurements received from the upstream location, wherein $\delta_{Pa}$ is an upstream leak pressure alteration factor according to $$\delta_{Pa} = \frac{P_a^{n=0} - P_a^{n=1}}{P_a^{n=0}}$$

and $\delta_{Qa}$ is an upstream leak flow alteration factor according to $$\delta_{Qa} = \frac{Q_a^{n=1} - Q_a^{n=0}}{Q_a^{n=0}},$$

wherein $$LRF_a = \frac{(1 - \delta_{Pa})}{(1 + \delta_{Qa})};$$

determining, independent of boundary conditions, a downstream leak response function $LRF_b$ using the mass flow rate and pressure measurements received from the upstream location, wherein $\delta_{Pb}$ is a downstream leak pressure alteration factor according to $$\delta_{Pb} = \frac{P_b^{m=0} - P_b^{m=1}}{P_b^{m=0}}$$

and $\delta_{Qb}$ is a downstream leak flow alteration factor according to $$\delta_{Qb} = \frac{Q_b^{m=1} - Q_b^{m=0}}{Q_b^{m=0}},$$

wherein $LRF_b = (1 - \delta_{Pb})(1 - \delta_{Qb})$;

where $P_a^{n=0}$ is the pressure and $Q_a^{n=0}$ is the mass flow rate at the upstream location before the leak;

where $P_b^{m=0}$ is the pressure and $Q_b^{m=0}$ is the mass flow rate at the downstream location before the leak;

wherein the distance between the upstream location and the downstream location is L, detecting a first reflected perturbation wave at the upstream location at a time $t_a^{n=2}$;

determining a distance X from the upstream location to the leak, according to:

$$X = \frac{L}{2}\left(1 + \frac{t_a^{n=1} - t_b^{m=1}}{t_b^{m=1} - t_a^{n=2}}\right);$$

determining a first i=1 leak mass flow rate $Q_{leak}^{i=1}$ according to:

$Q_{leak}^{i=1} = Q_a^{n=1} - Q_b^{m=1}$; and indicating a leak event when $LRF_a$ and $LRF_b$ trend downward simultaneously, the location of the leak relative to the upstream location, and the leak mass flow rate.

2. The method of claim 1, wherein $LRF_a$ and $LRF_b$ trend downward simultaneously by at least a predetermined leak response function threshold.

3. The method of claim 2, wherein the leak response function threshold is the combined measurement accuracy of the mass flow rate and pressure measurements from the upstream location and the mass flow rate and pressure measurements from the downstream location.

4. The method of claim 1, further comprising:
   detecting a first reflected perturbation wave at the upstream meter at a time $t_b^{m=2}$; and $t_a^{n=1}$
   determining a distance Y from the downstream location to the leak according to:

$$Y = \frac{L}{2}\left(1 + \frac{t_b^{m=1} - t_a^{n=1}}{t_a^{n=1} - t_b^{m=2}}\right);$$

and
   indicating the location of the leak relative to the downstream location.

5. The method of claim 1, wherein the upstream location is downstream from a pump or compressor.

6. The method of claim 1, wherein the downstream location is upstream from a pump or compressor.

7. A system for detecting, locating, and measuring a leak in a closed system fluid transport pipeline with in-line multiphase mass flow meters at an upstream location and a downstream location, comprising:
   an upstream in-line multiphase flow meter for measuring multiphase mixture pressure and multiphase mixture mass flow rate at the upstream location in the fluid transport pipeline;
   a downstream in-line multiphase flow meter for measuring multiphase mixture pressure and multiphase mixture mass flow rate at the downstream location in the fluid transport pipeline;
   a remote terminal unit for continuously receiving pressure and mass flow rate data from the upstream meter and sending it to the control center;
   a remote terminal unit for continuously receiving pressure and mass flow rate data from the downstream meter and sending it to the control center; and
   a control center, continuously receiving the data from the remote terminal unit, the control center having a supervisory control and data acquisition (SCADA) system for determining, in an automated, real-time transient analysis, a leak response function comprising:
      detecting an upstream first n=1 leak perturbation wave at the upstream location a at time $t_a^{n=1}$ having a transient pressure of $P_a^{n=1}$ and a transient mass flow rate of $Q_a^{n=1}$;
      detecting a downstream first m=1 leak perturbation wave at the downstream location b at a time $t_b^{m=1}$, having a transient pressure of $P_b^{m=1}$ and a transient mass flow rate of $Q_b^{m=1}$;
      determining, independent of boundary conditions, an upstream leak response function $LRF_a$ using the mass flow rate and pressure measurements received from the upstream location, wherein $\delta_{Pa}$ is an upstream leak pressure alteration factor according to $$\delta_{Pa} = \frac{P_a^{n=0} - P_a^{n=1}}{P_a^{n=0}}$$

and $\delta_{Qa}$ is an upstream leak flow alteration factor according to $$\delta_{Qa} = \frac{Q_a^{n=1} - Q_a^{n=0}}{Q_a^{n=0}},$$

wherein $$LRF_a = \frac{(1 - \delta_{Pa})}{(1 + \delta_{Qa})};$$

determining, independent of boundary conditions, a downstream leak response function $LRF_b$ using the mass flow rate and pressure measurements received from the upstream location, wherein $\delta_{Pb}$ is a downstream leak pressure alteration factor according to $$\delta_{Pb} = \frac{P_b^{m=0} - P_b^{m=1}}{P_b^{m=0}}$$

and $\delta_{Qb}$ is a downstream leak flow alteration factor according to $$\delta_{Qb} = \frac{Q_b^{m=1} - Q_b^{m=0}}{Q_b^{m=0}},$$

wherein $LRF_b = (1-\delta_{Pb})(1-\delta_{Qb})$;
where $P_a^{n=0}$ is the pressure and $Q_a^{n=0}$ is the mass flow rate at the upstream location before the leak;
where $P_b^{m=0}$ is the pressure and $Q_b^{m=0}$ is the mass flow rate at the downstream location before the leak;
wherein the distance between the upstream meter and the downstream meter is L, detecting a first reflected perturbation wave at the upstream location at a time $t_a^{n=2}$;
determining a distance X from the upstream location to the leak, according to:

$$X = \frac{L}{2}\left(1 + \frac{t_a^{n=1} - t_b^{m=1}}{t_b^{m=1} - t_a^{n=2}}\right);$$

determining a first $i=1$ leak mass flow rate $Q_{leak}^{i=1}$ according to:

$Q_{leak}^{i=1} = Q_a^{n=1} - Q_b^{m=1}$; and adapted to indicate a leak event when $LRF_a$ and $LRF_b$ trend downward simultaneously, the location of the leak relative to the upstream location, and the leak mass flow rate.

8. The system of claim 7, wherein the distance between the upstream meter and the downstream meter is L, the leak response function further comprising:
   detecting a first reflected perturbation wave at the upstream location at a time $t_b^{m=2}$; and determining a distance Y from the downstream location to the leak, according to:

$$Y = \frac{L}{2}\left(1 + \frac{t_b^{m=1} - t_a^{n=1}}{t_a^{n=1} - t_b^{m=2}}\right);$$

and indicating the location of the leak relative to the downstream location.

9. The system of claim 7, wherein the pipeline is composed of multiple sections with intermediary pumping stations or compressor stations.

10. The system of claim 7, where the pipeline carries any fluid such as water, oil or gas or multiphase mixture including components of water, oil or gas.

11. A supervisory control and data acquisition (SCADA) system for a pipeline control center for detecting, locating, and measuring a leak in a closed system fluid transport pipeline using in-line multiphase mass flow meters at an upstream location and a downstream location, comprising:

a receiver for continuously receiving multiphase mass flow rate data and pressure data from an upstream multiphase mass flow meter at the upstream location and multiphase mass flow rate data and pressure data from a downstream multiphase mass flow meter at the downstream location;

a computer for performing, in an automated, real-time transient analysis, an upstream leak response function $LRF_a$ using the data received from the upstream multiphase mass flow meter and a downstream leak response function $LRF_b$ using the data received from the downstream multiphase mass flow meter, according to:

detecting an upstream first n=1 leak perturbation wave at the upstream location a at time $t_a^{n=1}$ having a transient pressure of $P_a^{n=1}$ and a transient mass flow rate of $Q_a^{n=1}$;

detecting a downstream first m=1 leak perturbation wave at the downstream location b at a time $t_b^{m=1}$, having a transient pressure of $P_b^{m=1}$ and a transient mass flow rate of $Q_b^{m=1}$;

determining, independent of boundary conditions, an upstream leak response function $LRF_a$ using the mass flow rate and pressure measurements received from the upstream location, wherein $\delta_{Pa}$ is an upstream leak pressure alteration factor according to $$\delta_{Pa} = \frac{P_a^{n=0} - P_a^{n=1}}{P_a^{n=0}}$$

and $\delta_{Qa}$ is an upstream leak flow alteration factor according to $$\delta_{Qa} = \frac{Q_a^{n=1} - Q_a^{n=0}}{Q_a^{n=0}},$$

wherein $$LRF_a = \frac{(1 - \delta_{Pa})}{(1 + \delta_{Qa})};$$

determining, independent of boundary conditions, a downstream leak response function $LRF_b$ using the mass flow rate and pressure measurements received from the upstream location, wherein $\delta_{Pb}$ is a downstream leak pressure alteration factor according to $$\delta_{Pb} = \frac{P_b^{n=0} - P_b^{n=1}}{P_b^{n=0}}$$

and $\delta_{Qb}$ is a downstream leak flow alteration factor according to $$\delta_{Qb} = \frac{Q_b^{m=1} - Q_b^{m=0}}{Q_b^{m=0}},$$

wherein $LRF_b = (1 - \delta_{Pb})(1 - \delta_{Qb})$;

where $P_a^{n=0}$ is the pressure and $Q_a^{n=0}$ is the mass flow rate at the upstream location before the leak;

where $P_b^{m=0}$ is the pressure and $Q_b^{m=0}$ is the mass flow rate at the downstream location before the leak;

wherein the distance between the upstream meter and the downstream meter is L, detecting a first reflected perturbation wave at the upstream meter at a time $t_a^{n=2}$; and wherein the leak response function further comprising determining a distance from the upstream location to the leak X, according to:

$$X = \frac{L}{2}\left(1 + \frac{t_a^{n=1} - t_b^{m=1}}{t_b^{m=1} - t_a^{n=2}}\right);$$

determining a first i=1 leak mass flow rate $Q_{leak}^{i=1}$, according to:

$$Q_{leak}^{i=1} = Q_a^{n=1} - Q_b^{m=1}; \text{ and}$$

indicating a leak event when $LRF_a$ and $LRF_b$ trend downward simultaneously, the location of the leak relative to the upstream location, and the leak mass flow rate.

12. The system of claim 11, wherein the distance between the upstream meter and the downstream meter is L, further comprising:

detecting a first reflected perturbation wave at the downstream location at a time $t_b^{m=2}$; and wherein the leak response function further comprises determining a distance Y from the downstream location to the leak, according to:

$$Y = \frac{L}{2}\left(1 + \frac{t_b^{m=1} - t_a^{n=1}}{t_a^{n=1} - t_b^{m=2}}\right);$$

and indicating the location of the leak relative to the downstream location.

13. A non-transitory computer-readable storage medium-comprising computer-readable code embodied therein, the non-transitory computer-readable code executable by a processor of a computer to implement the method according to any one of claims 1, 2, 3, 4, and 5-6.

14. A system using in-line multiphase mass flow meters at an upstream location and a downstream location of a fluid transport pipeline, comprising:
- an in-line multiphase mass flow meter at the upstream location for measuring mass flow Q and pressure P of the mixture through the pipeline at the upstream location;
- an in-line multiphase mass flow meter at the downstream location for measuring mass flow Q and pressure P of the mixture through the pipeline at the downstream location;
- a computer adapted to calculate, in an automated real-time transient analysis, a leak response function comprising:
  - detecting an upstream first n=1 leak perturbation wave at the upstream location a at time $t_a^{n=1}$ having a transient pressure of $P_a^{n=1}$ and a transient mass flow rate of $Q_a^{n=1}$;
  - detecting a downstream first m=1 leak perturbation wave at the downstream location b at a time $t_b^{m=1}$, having a transient pressure of $P_b^{m=1}$ and a transient mass flow rate of $Q_b^{m=1}$;
  - determining, independent of boundary conditions, an upstream leak response function $LRF_a$ using the mass flow rate and pressure measurements received from the upstream location, wherein $\delta_{Pa}$ is an upstream leak pressure alteration factor according to $$\delta_{Pa} = \frac{P_a^{n=0} - P_a^{n=1}}{P_a^{n=0}}$$

and $\delta_{Qa}$ is an upstream leak flow alteration factor according to $$\delta_{Qa} = \frac{Q_a^{n=1} - Q_a^{n=0}}{Q_a^{n=0}},$$

wherein $$LRF_a = \frac{(1 - \delta_{Pa})}{(1 + \delta_{Qa})};$$

determining, independent of boundary conditions, a downstream leak response function $LRF_b$ using the mass flow rate and pressure measurements received from the upstream location, wherein $\delta_{Pb}$ is a downstream leak pressure alteration factor according to $$\delta_{Pb} = \frac{P_b^{m=0} - P_b^{m=1}}{P_b^{m=0}}$$

and $\delta_{Qb}$ is a downstream leak flow alteration factor according to $$\delta_{Qb} = \frac{Q_b^{m=1} - Q_b^{m=0}}{Q_b^{m=0}},$$

wherein $LRF_b = (1 - \delta_{Pb})(1 - \delta_{Qb})$;
where $P_a^{n=0}$ is the pressure and $Q_a^{n=0}$ is the mass flow rate at the upstream location before the leak;
where $P_b^{m=0}$ is the pressure and $Q_b^{m=0}$ is the mass flow rate at the downstream location before the leak;
wherein the distance between the upstream meter and the downstream meter is L, detecting a first reflected perturbation wave at the upstream meter at a time $t_a^{n=2}$; and
wherein the leak response function further comprising determining a distance from the upstream location to the leak X, according to:

$$X = \frac{L}{2}\left(1 + \frac{t_a^{n=1} - t_b^{m=1}}{t_b^{m=1} - t_a^{n=2}}\right);$$

determining a first i=1 leak mass flow rate $Q_{leak}^{i=1}$, according to:

$$Q_{leak}^{i=1} = Q_a^{n=1} - Q_b^{m=1}; \text{ and}$$

indicating a leak event when $LRF_a$ and $LRF_b$ trend downward simultaneously, the location of the leak relative to the upstream location, and the leak mass flow rate.

* * * * *